July 15, 1924.

A. S. BURNETT ET AL

CLUTCH CONTROLLED GEARING

Filed May 28, 1923　　3 Sheets-Sheet 1

1,501,199

Inventors:—
Alexander Stirling Burnett
Thomas Collins.

By their Attorney:— Walter Gwinn

July 15, 1924.

A. S. BURNETT ET AL 1,501,199

CLUTCH CONTROLLED GEARING

Filed May 28, 1923    3 Sheets-Sheet 2

Inventors:-
Alexander Stirling Burnett
Thomas Collins

By their Attorney:- Walter Swan

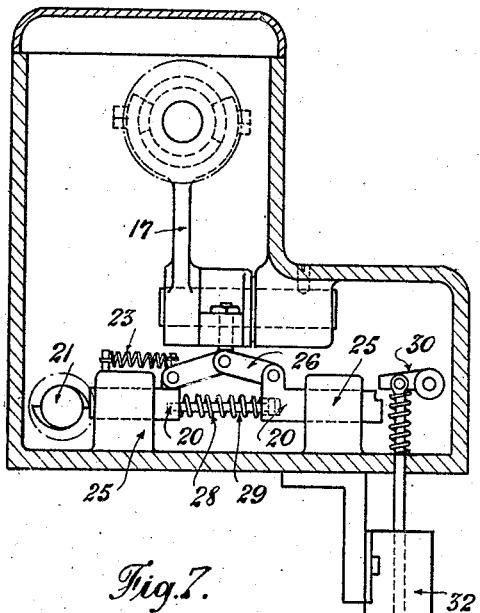
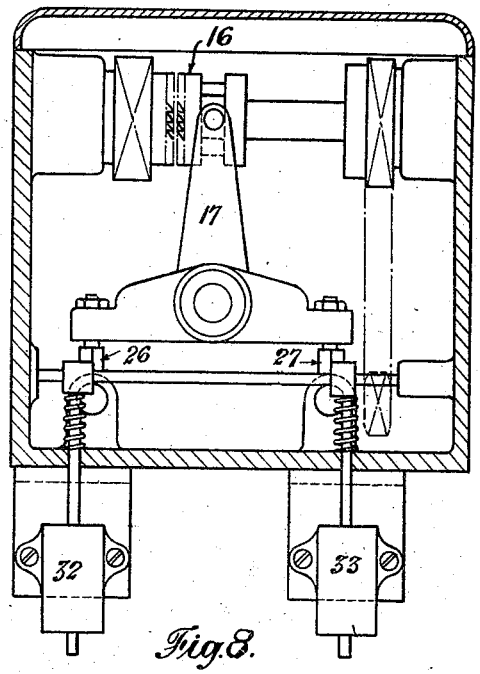
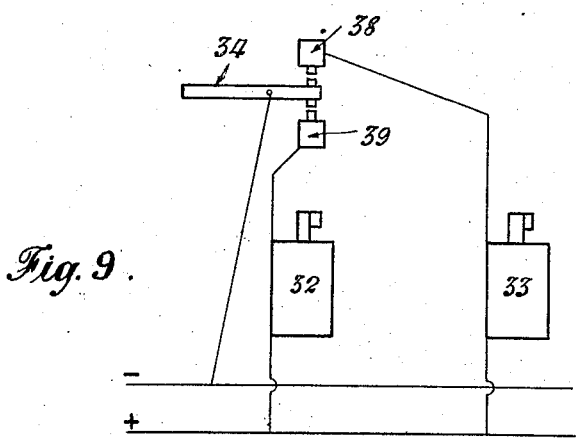

Patented July 15, 1924.

1,501,199

UNITED STATES PATENT OFFICE.

ALEXANDER STIRLING BURNETT, OF REDDISH, AND THOMAS COLLINS, OF MANCHESTER, ENGLAND, ASSIGNORS OF ONE-HALF TO FRANCIS SHAW AND COMPANY, LIMITED, OF MANCHESTER, ENGLAND.

CLUTCH-CONTROLLED GEARING.

Application filed May 28, 1923. Serial No. 642,059.

*To all whom it may concern:*

Be it known that we, ALEXANDER STIRLING BURNETT and THOMAS COLLINS, both subjects of the King of Great Britain and Ireland, residing at Reddish and Manchester, England, respectively, have invented new and useful Improvements in or Relating to Clutch-Controlled Gearing, of which the following is a specification.

This invention relates to clutch controlled gearing and has for its object to provide improved mechanically operated and electrically controlled means to actuate the clutches.

According to the invention clutch controlled gearing is provided applicable for a variety of mechanisms or machines wherein the movable elements of the clutches are actuated by cams or eccentrics driven from a moving part of the machine or mechanism, and acting through hit and miss mechanism which is selectively actuated either automatically or manually.

A convenient form of such mechanism consists of two slidably mounted elements one end of each of which makes contact with a cam or eccentric driven at a comparatively high speed from a convenient rotating element and so that both elements are reciprocated with each revolution of the cam or cams, a spring or other suitable means being provided to maintain said elements in contact with the cam or cams.

Each element, hereinafter referred to as the sliding toggle, comprises two end pieces slidably mounted in suitable guides and connected together by toggle links. The end pieces are normally pressed apart by a spring for a distance governed by a tie-bar, the distance being such that the respective toggle is almost in the straight line position and the strength of the spring is such that each element is reciprocated in the extended position by the cam, until the free end is obstructed by a hit and miss lever. When so obstructed the two parts or ends of the respective elements approach each other and the respective toggle is broken, the mid portion rising and actuating the clutch, the change lever for which is in the form of a T-lever pivotally mounted at the junction, the vertical arm of which is coupled to the movable element of the clutch and the end of each horizontal arm lying over one of the toggle elements.

The toggles are broken alternately by which means the clutches are positively actuated in both directions, and a second set of hit and miss mechanism may be provided to break both toggles simultaneously to an extent sufficient to move the movable clutch element into the mid or neutral position when using a double ended clutch.

The hit and miss levers are actuated by electromagnets the electric circuits to which are selectively made and broken by suitable switches.

The invention will be more particularly described by the aid of the accompanying drawings, wherein:—

Figs. 7 and 8 are side and front views corresponding to Figures 3 and 4 showing the neutralizing lever and associated parts dispensed with, and Fig. 9 is a diagram of the wiring for such an arrangement.

Figure 1:
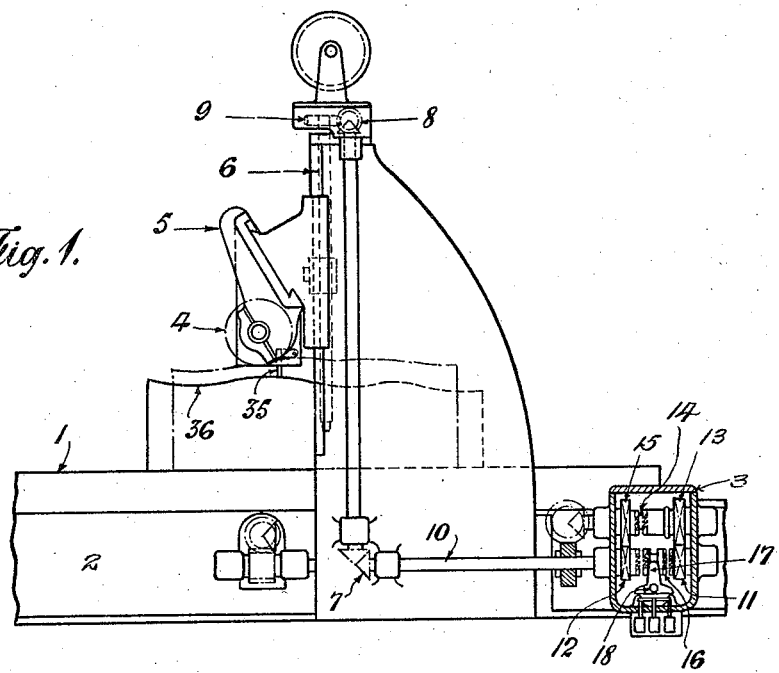
Fig. 1 is a side elevation showing the invention applied to a machine, wherein the work is adapted to be uniformly traversed in one direction while the tool is adapted to be traversed forwardly or backwardly relative to the face of the work or stopped altogether as governed in conformity with a profile gauge through an electrically controlled element.
Figure 2:
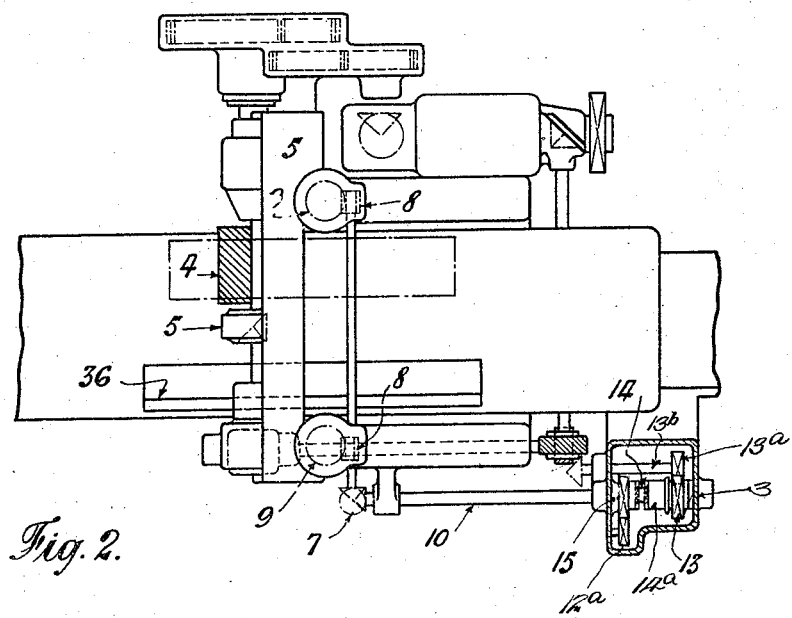
Fig. 2 is a plan view of Figure 1.

Referring to Figures 1 to 4 of the drawings, which show a Plano-miller, the table 1 is slidably mounted on the bed 2 of the machine and is reciprocated by known means driven from any suitable source of power through the change speed gear box 3. The cutter 4 is rotatably mounted on the saddle 5 which is traversed vertically by the screw 6, which is also driven from the gear box 3 through the bevel wheels 7 and wormwheels 8 and 9. The bevel wheels 7 are secured to a short shaft 10, to which is secured the pinions 11 and 12. The clutch pinion 11 meshes with a pinion 13 rotatably mounted on the counter shaft 14, while the clutch pinion 12 meshes with an idler wheel 12ª which in turn meshes with a pinion 15 which is also rotatably mounted on the counter shaft 14 the pinions 13 and 15 being selectively clutched to the counter shaft 13ᵇ by means of the sliding dog 14ª. The pinion 13 is driven by means of a pinion 13ª on a counter shaft 13ᵇ driven from the gear box 3. The clutch pinions 11 and 12 are selectively clutched to the shaft 10 by a clutch 16 reciprocated by the T-lever 17 which is pivotally mounted at 18 and rocked by means of hit and miss mechanism electrically controlled.

Figure 3:
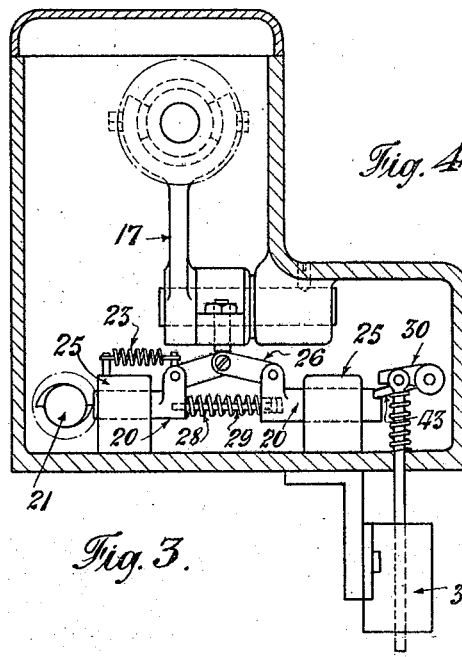
Fig. 3 is an end elevation of the clutch control mechanism detached, of which—
Figure 4:
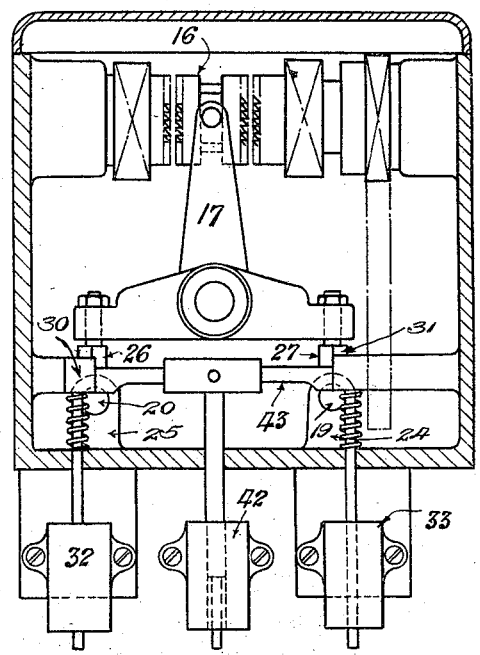
Fig. 4 is a front view.
Figure 6:
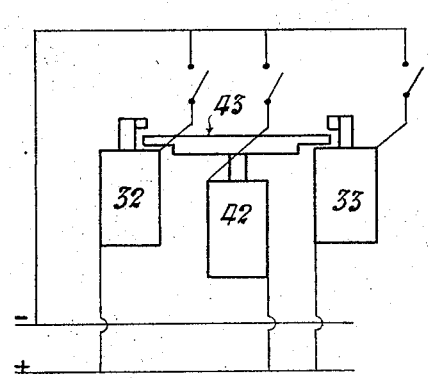
Fig. 6 shows a still further modified method of wiring the electromagnets in which not only are the hit and miss magnets hand controlled but the electromagnet for the neutralizing lever is also capable of being controlled separately by hand.
Figure 5:
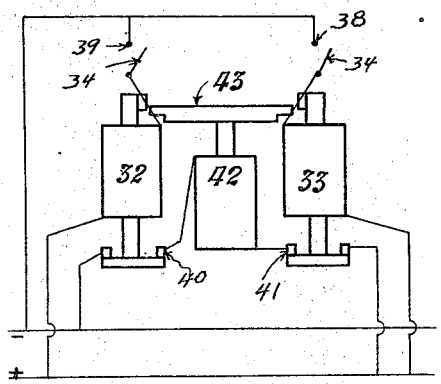
Fig. 5 shows a modified method of wiring for the electromagnets where the hit and miss electromagnets are controlled by hand operated switches.

A convenient form of such mechanism consists of two slidably mounted elements 19 and 20 see Figures 3 and 4. One end of each element is engaged by a cam 21 or eccentric, said cams being formed in one with or fixed to a cam shaft 22 driven at a comparatively high speed from a convenient rotating element and adapted to force both elements outwardly at each revolution, springs 23 or other suitable means being provided to maintain said elements in contact with the cam 21 or eccentric. Each element 19 or 20 hereinafter referred to as the sliding toggle, comprises two end pieces slidably mounted in suitable guides 24, 25, and connected together by toggle links 26 or 27. The end pieces are normally pressed apart by a spring 28 for a distance governed by a tie-bar 29, said distance being such that the respective toggle 26 or 27 is almost in the straight line position and the strength of the spring 28 is such that each element 19 and 20 is reciprocated in the extended position by the respective cam 21, until the free end is obstructed by a hit and miss lever 30 or 31 respectively. When so obstructed the two parts or ends of the respective elements 19, 20 approach each other and the respective toggle 26 or 27 is broken, the mid portion rising and actuating the before-mentioned clutch 16 through the change lever 17, the vertical arm of which is coupled to the movable clutch element 16, while the end of each horizontal arm lies over one of the toggle elements 26 or 27. The toggles are broken alternately by which means the clutch element 16 is positively actuated in both directions.

The hit and miss levers 30 and 31 are actuated by electro-magnets 32 and 33 respectively the electric circuits to which are selectively made and broken by a switch arm 34 carried by a fitting on the saddle 5 and controlled by a pointer or tracer adapted to contact with a relatively fixed contour gauge 36 on the table 1 of the machine, the movements of the tracer being imparted to the switch 34 through compound levers.

When the circuit is completed by the arm 34 through the switch contact 38 the electromagnet 33 is energized and the respective hit and miss lever 31 drawn down to obstruct the respective toggle 27, which is broken and rocks the lever 17 to put the upward traverse into gear. When the circuit is completed through the switch contact 39 the electromagnet 32 is energized and the hit and miss lever 30 drawn down to obstruct the other toggle 26 to rock the levers 17 in the reverse direction to traverse the tool downwardly.

When the switch arm 34 is in the mid position and neither of the electromagnets 32 or 33 is energized, the cores of the same, move upwards under spring pressure and contacts 40 and 41 on said cores complete the circuit to a third electromagnet 42 which draws a neutralizing lever 43 into position to engage both toggles 26 and 27 after the manner of the hit and miss levers 30 and 31 and by partly breaking the same simultaneously, rock the lever 17 to move the clutch 16 into mid and inoperative or neutral position.

When it is only required to rotate in one direction say to feed the tool in one direction the neutralizing lever 43 and connections, together with one of the clutch pinions can be dispensed with. Such an arrangement is shown in Figs. 7, 8 and 9 wherein the T-lever 17 and actuating mechanism is the same as that described in the last example but the clutch pinion 15 is dispensed with and only a forward and stop motion can be obtained. In this case the switch arm 34 may be automatically actuated by the tracer, or by hand.

We wish it to be understood that clutch controlled gearing actuated and controlled as above described may be used not only for controlling the feed motions of profiling machines but for speed and feed changing purposes in any type of mechanism.

What we claim is:—

1. In clutch controlled gearing comprising fixed and relatively moving elements, the combination with the moving element of a lever toggle links adapted to be broken to rock said lever in both directions, cams to reciprocate said toggle links, movable elements mounted so as to be capable of movement into and out of the path of said toggle links and means to actuate said movable elements, substantially as described.

2. In clutch controlled gearing comprising fixed and relatively moving elements, a pivotally mounted T-lever for reciprocating the moving element, toggle links mounted adjacent to opposite limbs of the T-lever, cams for reciprocating the toggle links and movable elements mounted so as to be capable of movement into and out of the path of said toggle links and means to actuate said movable elements, substantially as described.

3. In clutch controlled gearing comprising fixed and relatively moving elements, a pivotally mounted T-lever for reciprocating the moving element, toggle links mounted below the limbs of the T-lever, cams for reciprocating the toggle links, movable elements adapted to be moved into and out of the path of the toggle links and means to actuate said movable elements to cause them to selectively brake the toggle links, and reciprocate the moving clutch element to one end or other of its stroke together with a further movable element and means to actuate the same to simultaneously break both toggles, substantially as described.

4. In clutch controlled gearing comprising fixed and relatively moving elements, the combination with the moving element of a T-lever for reciprocating said element, toggle links, cams for reciprocating the links, means to break the toggle separately to an extent to rock the lever to render the clutch operative and means to break both toggles simultaneously to render the clutch inoperative substantially as described.

5. In clutch controlled gearing comprising fixed and relatively moving elements, the combination with the moving element of a T-lever for reciprocating said element, toggle links, cams for reciprocating the links, means to break the toggles separately to an extent to rock the lever to render the clutch operative and means to break both toggles simultaneously to render the clutch inoperative and electrical selective mechanism to control said toggle breaking means, substantially as described.

In testimony whereof we have signed our names to this specification.

ALEXANDER STIRLING BURNETT.
THOMAS COLLINS.